United States Patent [19]

Ebbeson et al.

[11] 4,146,107

[45] Mar. 27, 1979

[54] APPARATUS IN VEHICLES WITH COMPRESSED AIR BRAKE SYSTEMS FOR ACTUATING THE BRAKE SYSTEM ON THE DETECTION, BY A SENSOR, OF AN OBSTACLE IN THE PATH OF THE VEHICLE

[76] Inventors: Bengt E. O. Ebbeson, Järnvägsgatan 8, 302 48 Halmstad; Åke L. Sjöberg, Torsdagsgränd 15, 302 53 Halmstad; Franz B. Sjögren, Pl 10911, 305 90 Halmstad, all of Sweden

[21] Appl. No.: 794,517

[22] Filed: May 6, 1977

[30] Foreign Application Priority Data

May 18, 1976 [SE] Sweden .............................. 7605613

[51] Int. Cl.² ................................................ B60T 7/12
[52] U.S. Cl. ........................................ 180/92; 303/9
[58] Field of Search ............... 180/91, 92; 303/9, 71, 303/68; 180/94, 95, 103 BF

[56] References Cited

U.S. PATENT DOCUMENTS

| 2,588,815 | 3/1952 | Fasolino | 180/92 |
|---|---|---|---|
| 3,023,829 | 3/1962 | Kuttler | 180/92 |
| 3,059,716 | 10/1962 | Iserman | 180/92 X |
| 3,095,244 | 6/1963 | Valentine | 303/9 |
| 3,917,037 | 11/1975 | Prillinger | 303/9 X |
| 3,954,304 | 5/1976 | Engle | 303/9 |
| 4,003,606 | 1/1977 | Plantan | 303/9 |

*Primary Examiner*—Kenneth H. Betts
*Attorney, Agent, or Firm*—Laurence R. Brown

[57] ABSTRACT

Compressed air brakes on a vehicle are actuated by an obstacle sensor switch via electromagnetic valves to draw compressed air from both parking and service brake compressed air supplies for operation of the service brakes to avoid depletion of the service brake air supply. Also, the parking brake cylinder may be rapidly emptied from control of the obstacle sensor by means of a rapid empty valve connected to the brake cylinders of the parking brake circuit.

10 Claims, 1 Drawing Figure

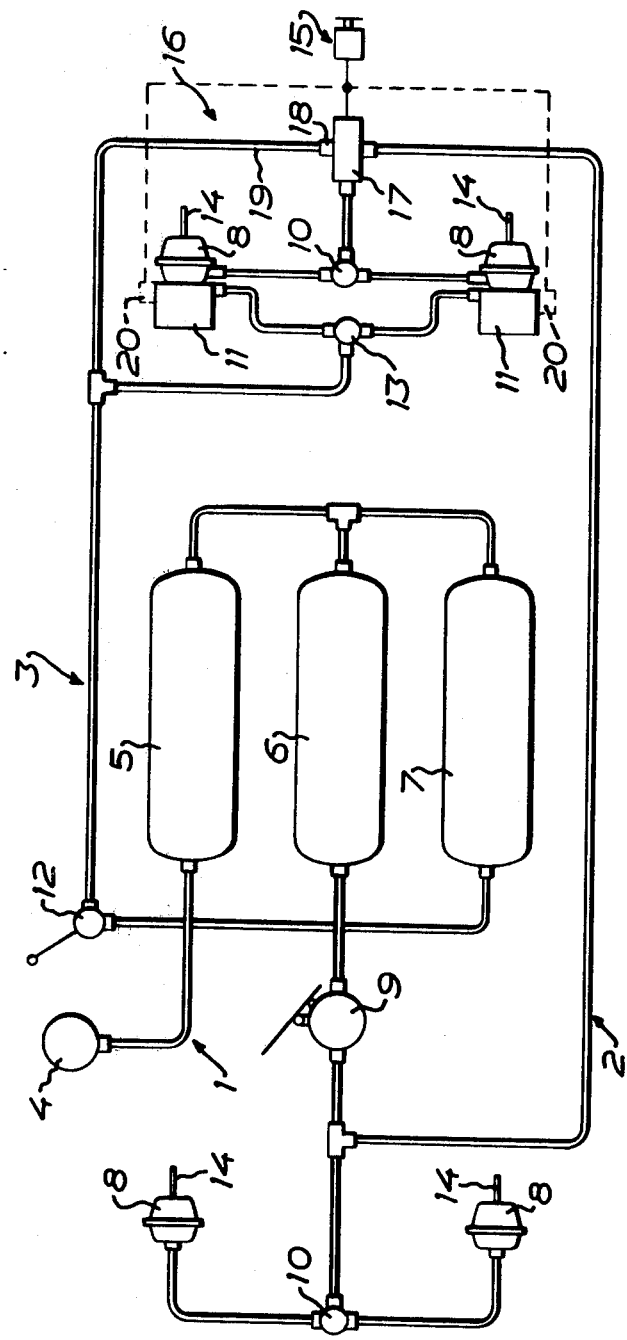

APPARATUS IN VEHICLES WITH COMPRESSED AIR BRAKE SYSTEMS FOR ACTUATING THE BRAKE SYSTEM ON THE DETECTION, BY A SENSOR, OF AN OBSTACLE IN THE PATH OF THE VEHICLE

The present invention relates to an apparatus in vehicles with compressed air brake systems for actuating the brake system on the detection, by a sensor, of an obstacle in the path of the vehicle. The brake system involved has a service brake circuit and a parking brake circuit, each with a compressed air tank, braking cylinders for applying and releasing associated service and parking brakes when the vehicle is en route and stationary, respectively, and a manually actuable valve installed between their respective air pressure tank and braking cylinders.

Patent literature in the art discloses many various suggested sensing devices intended to actuate the compressed air brake system of a vehicle via an operating device for stopping the vehicle when the sensing device detects an obstacle in its path. In the majority of these prior art proposals, the sensing device in question is of a purely mechanical type which is actuated on direct contact with the obstacle. However, it is also known in the art to utilize ultra-sonic devices, photocells etc. for detecting an obstacle. All selected means for detection will hereafter be generally designated sensors.

As regards the method by which the brake system is supposed to be actuated, considerably fewer devices are known in the art. It is merely known to apply the service brakes utilizing either the standard compressed air tank or tanks for the service brakes or a specially installed auxiliary tank for the operating device particularly selected in each separate case for stopping the vehicle.

The disadvantages inherent in the above-described proposed improvements to the art are considerable. The attention of the reader is drawn not only to the economic aspects of the prior art devices but also the increased risks for leakage and damage which any extra fluid lines naturally entail. This aspect concerns primarily the prior art proposal for extra tanks. As regards the utilization of the standard compressed air tanks associated with the service brakes, it should be particularly emphasized that both these tanks and the tank for the parking brakes are normally placed in the leading region of the vehicle, as a rule immediately under the driver's cab. The pressure of the compressed air in the service brake circuit tank also prevails on the inlet side of the manually actuable service brake valve (footbrake valve) and must, for actuation of the rear service brake cylinders and consequential application of the service brakes, be transmitted about five meters. When a trailer is fitted to the vehicle, this distance is doubled or trebled. Thus, once the sensor has detected the obstacle and initiated actuation of the brake system, the vehicle may roll a further distance of a few centimeters before the compressed air pressure has increased sufficiently to stop the vehicle.

The most essential and decisive deficency in utilizing the service brake tanks for the above-described purpose relates to general road safety. Clearly, each time automatic application of the brakes occurs under actuation from the sensor, compressed air must be drawn from the compressed air tanks. Moreover, each time the vehicle is driven forwards and stopped by application of the brakes by means of the footbrake valve, further compressed air flows from the tanks. Consequently, when the vehicle is subjected to a series of reverse-forward manoeuvres — by no means uncommon in narrow passages and the like — the effect of the service brake circuit operated by the footbrake valve will be weakened to such an extent that the risk for serious traffic hazards can occur.

The object of the present invention is to cause the sensor, on detecting an obstacle, particularly during reverse manoeuvres, to actuate an operating device for applying the brakes making greatest possible utilization of the compressed air brake system on the vehicle while retaining the full effect of the service brake circuit and reducing to a minimum the time-lag for the transmittal of the compressed air.

This object is achieved according to the invention in an apt and simple manner by means of a valve assembly which is actuable by the sensor and is caused, on actuation, to open, so as to supply compressed air directly from the parking brake circuit to the brake cylinders of the service brake circuit for applying the service brakes and/or for voiding the brake cylinders of the parking brake circuit for applying the parking brakes.

The nature of the present invention and its aspects will be more fully understood from the following description of the drawing, and discussion relating thereto.

In the accompanying drawing:

The sole FIGURE illustrates schematically the major components in a compressed air brake system for heavy vehicles and shows, by means of solid lines, a first embodiment of the apparatus according to the invention and, with broken lines, a second embodiment thereof, which second embodiment may also constitute a complement to the first.

The compressed air brake system shown on the drawing is constructed, in general outlines, by a supply circuit 1, a service brake circuit 2 and a parking brake circuit 3. For the sake of simplicity, components which are included in the circuits but are of no consequence for the understanding of the invention, such as indicators, regulators, safety valves etc. have been omitted from the drawing.

The supply circuit 1 includes a compressor 4 driven by the vehicle engine and supplying compressed air to a wet tank 5 where minor quantitites of oil from the compressor and condensation are separated.

From the wet container 5 of the supply circuit 1, compressed air is supplied to a compressed air tank 6 included in the service brake circuit 2 and to a compressed air tank 7 included in the parking brake circuit 3.

The service brake circuit 2 comprises, apart from the tank 6, four brake cylinders 8 of the diaphragm type which, via their respective brake lever (not shown) turn an eccenter brake shaft for applying and releasing their respective service brake for the front and rear wheels of the vehicle. For applying the brakes, the brake cylinders 8 are supplied with compressed air from the tank 6, the braking effect being regulated by means of a footbrake valve 9 installed between the tank 6 and the brake cylinders 8. On release of the brakes, compressed air is released from the cylinders 8 and led into the atmosphere via rapid-empty valves 10.

The parking brake circuit 3 includes, apart from the tank 7, two brake cylinders 11 which are directly mounted to the two rear brake cylinders 8 of the service brake circuit 2 and each contains a spring-loaded piston, whose piston rod is movable, in the manner described below, into and out of abutment against piston rods 14 connected to the braking levers of associated service brake cylinders 8. Application and release of the parking brakes which, in the illustrated case, are the same as the rear service brakes, are regulated by means of a manual lever valve 12 installed between the tank 7 and the brake cylinders 11. The manual lever valve 12 is suitably placed in the driver's cab beside the driver's seat. The parking brakes are applied when the driver moves the manual lever valve 12 into the parking position, the compressed air in the brake cylinders 11 being released into the atmosphere via a rapid-empty valve 13 so that the piston rods of the spring-loaded pistons are moved into abutment against the piston rod 14 of the associated service brake cylinders 8 for applying the associated parking brake by the intermediary of the braking lever and eccenter braking shaft. For release of the parking brakes, the manual lever valve 12 is moved into the release position, compressed air from the tank 7 being fed, via the valve 12, to the parking brake cylinders 11 for moving the piston rods against the action of the springs out of abutment with an associated piston rod 14 on the service brake cylinders. When the parking brakes are released, the service brakes can be operated fully independently of the parking brakes. It will be apparent from the above that if it is to be at all possible to drive the vehicle, there must always be compressed air in the parking brake circuit 3, that is to say as far as to the braking cylinders 11 of the circuit.

A sensor 15 (shown schematically) of the type which, for example, constitutes the subject matter of SW 7404998-2 (U.S. Pat. No. 3,986,577) is provided for actuating the brake system for applying the brakes, in the illustrated case the rear brakes, when the vehicle, while reversing, strikes an obstacle in its path. The sensor 15 is, thus, preferably mounted at the rear of the vehicle and projects from the profile of the vehicle for detecting the obstacle in good time, such that the vehicle may be stopped before the obstacle damages the vehicle or is itself damaged. When the sensor has detected an obstacle, this electrically actuates, in a manner described in greater detail below, a valve assembly 16 installed in the compressed air brake system.

The valve assembly 16 is caused, on actuation by the sensor 15, to open for supplying compressed air direct from the parking brake circuit 3 to the two rear brake cylinders 8 of the service brake circuit 2 for applying the rear service brakes. As a complement or alternative to this arrangement, the valve assembly 16 can, in the same manner, be caused to open for voiding both of the brake cylinders 11 of the parking brake circuit 3 for applying the parking brakes in the above-indicated manner.

For applying both of the rear service brakes, the valve assembly 16 includes an electro-magnetically controlled three-way director valve 17 which is electrically connected to the sensor 15 for actuation by the sensor in the above-described way. The valve 17 is installed in the service brake circuit 2 between the footbrake valve 9 and the rear brake cylinders 8 as close to the brake cylinders as possible, in the illustrated case immediately ahead of the rapid-empty valve 10. The director valve 17 is connected on its inlet side 18 to the parking brake circuit 3 via a line 19, which entails that the pressure of the compressed air in the parking brake circuit 3 will, in all states apart from when the parking brakes are applied, prevail up to the inlet side 19 of the director valve 17. As a result, the compressed air in the parking brake circuit has a very short flow travel to the rear service brake cylinders 8 and thereby occasions very rapid application of the rear service brakes.

As was mentioned above, the valve assembly 16 can, as a complement or alternative to supplying compressed air to the service brake cylinders for applying the service brakes, empty the parking brake cylinder 11 for applying the parking brakes which, in the illustrated embodiment, are the same as the service brakes. To this end, the valve assembly 16 includes, as a complement or alternative to the director valve 17, two rapid-empty valves 20 connected each to a brake cylinder in the parking brake circuit 3. The valves 20 are electrically connected to the sensor 15 for actuation by the sensor in the same manner as the director valve 17.

The rapid or even immediate application of the service brakes and/or the parking brakes on the detection by the sensor 15 of an obstacle is, to the greatest possible extent, thanks to the short flow travel of the compressed air; in the one case the short distance between the director valve 17 and the service brake cylinders 8; and, in the other case, the short distance between the parking brake cylinders 11 and the atmosphere via the rapid-empty valves 20.

The immediate application of the brakes — compared with if the compressed air tank 6 of the service brake circuit 2 had been used — is even more marked when a long trailer is attached to the vehicle, since in this case the compressed air from the parking brake circuit may also be utilized immediately on the brakes of the trailer.

Naturally, the invention should not be considered as restricted to that described above and shown on the drawing, many modifications being possible within the spirit and scope of the appended claims. Thus, the valve 17 may be actuated in a manner other than electro-magnetically, for example, by means of a pressure wave created in the sensor 15 (which is suitably designed for this method of operation) when the sensor detects an obstacle, the pressure wave being transferred to the valve 17 by the intermediary of a suitable line. Furthermore, more than one sensor may be provided and placed at various suitable points on the vehicle for detecting obstacles not only behind the vehicle but also beside, beneath, above and even ahead of the vehicle.

We claim:

1. A vehicle fluid brake system with separate service and parking braking valves, comprising in combination, a service brake subsystem having at least one service brake cylinder coupled with a first fluid circuit providing selectively fluid at high pressure by operation of said service braking valve, a parking brake subsystem having at least one parking brake cylinder having a spring loaded piston therein tending to hold the brakes applied, said parking brake subsystem being coupled with a separate fluid circuit providing selectively fluid at high pressure to the piston to overcome the spring force and release the brakes in the absence of operation of said parking braking valve and to permit spring braking to overcome fluid pressure when the parking braking valve is operated, and a further valve assembly having a valve actuated by a force external to the fluid pressures in said fluid circuits connected to operate said service brake subsystem by coupling fluid under pressure directly from said separate fluid circuit to the service brake cylinder to operate the service brake cylinder of the service brake subsystem by said high pressure fluid, and by decoupling the first fluid circuit to prevent loss of said high pressure fluid therein.

2. A system as defined in claim 1 including separate fluid storage tanks for said two subsystems, and conduits operated by said further valve assembly coupling fluid from the parking brake storage tank to the service brake cylinder.

3. A system as defined in claim 2 wherein said valve of said further valve assembly is located in proximity to said service brake cylinder.

4. A system as defined in claim 1 wherein the system is installed upon a vehicle having a sensor extending therefrom to detect obstacles in its path by impact therewith and means actuating said valve assembly from said sensor thereby to operate said service brake subsystem by said force external to the fluid pressures by force of impact of said sensor with said obstacles.

5. A system as defined in claim 4 wherein said valve assembly is electromagnetically controlled by said sensor.

6. A system as defined in claim 4 including a set of voiding valves for the parking brake cylinders and means operating them to void the parking brake cylinders in response to said impact with an obstacle by said sensor.

7. A system as defined in claim 1 wherein said service braking valve comprises a manually actuated service brake valve in said service brake circuit, wherein said further valve assembly comprises a three way director valve installed in the service brake subsystem between said manually actuated valve and the service brake cylinders.

8. A system as defined in claim 7 having a plurality of front and rear service brake cylinders wherein the director valve is installed close to the rear service brake cylinders.

9. A system as defined in claim 1 wherein the further valve assembly consists of a single transfer valve which when actuated disconnects said first fluid circuit from said service brake cylinder and connects said further fluid circuit thereto to operate said service brake cylinder.

10. A system as defined in claim 1 including means to operate said parking brake subsystem independently of said parking brake valve by venting said fluid under pressure from said parking brake cylinder when said external force operates the further valve.

* * * * *